United States Patent Office 3,579,422
Patented May 18, 1971

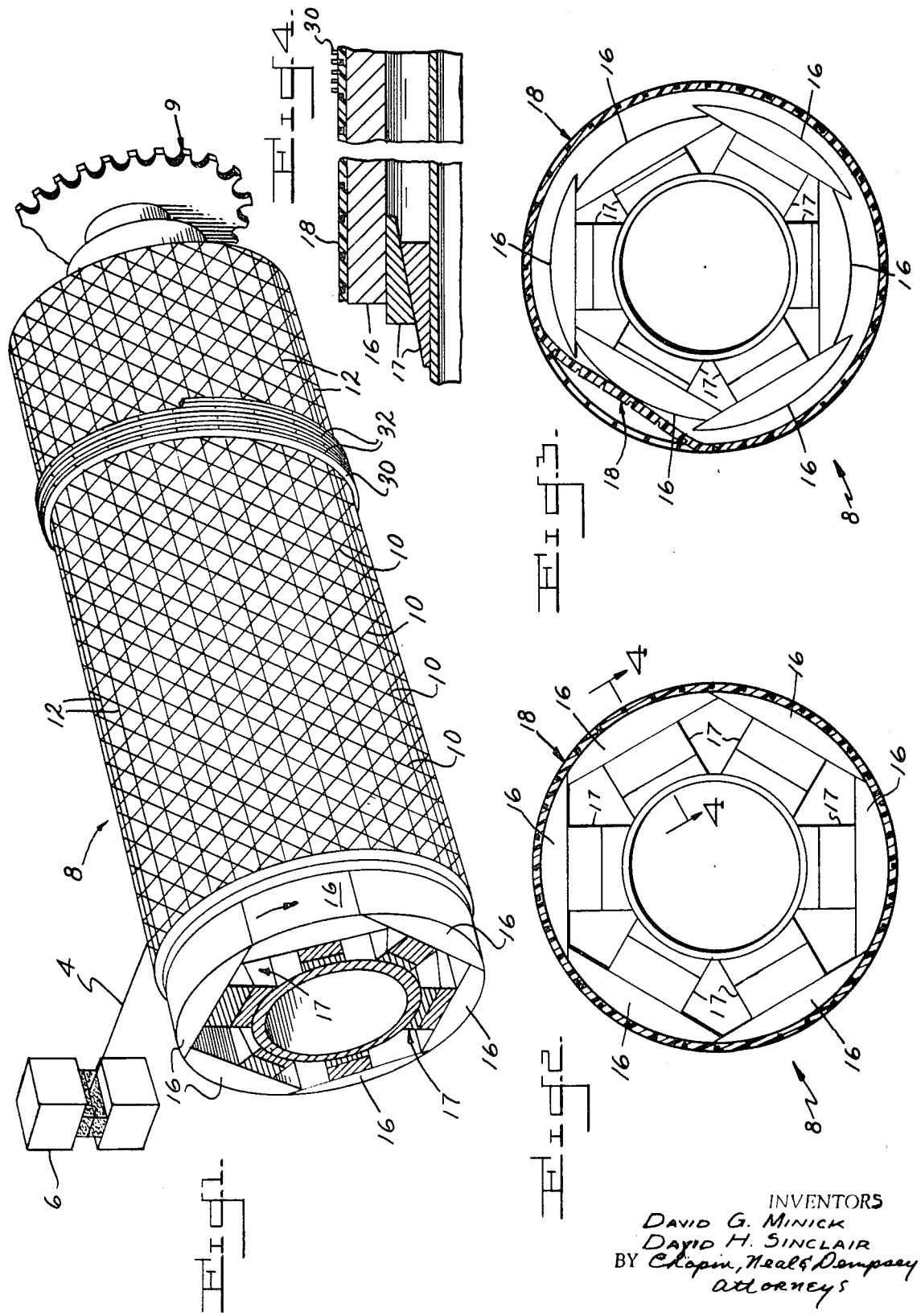

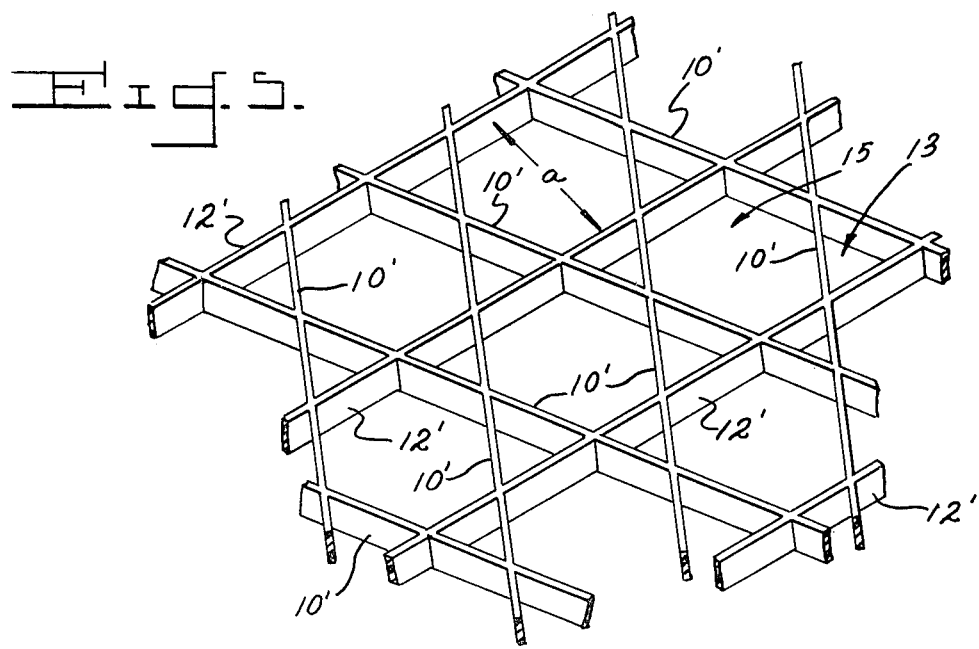
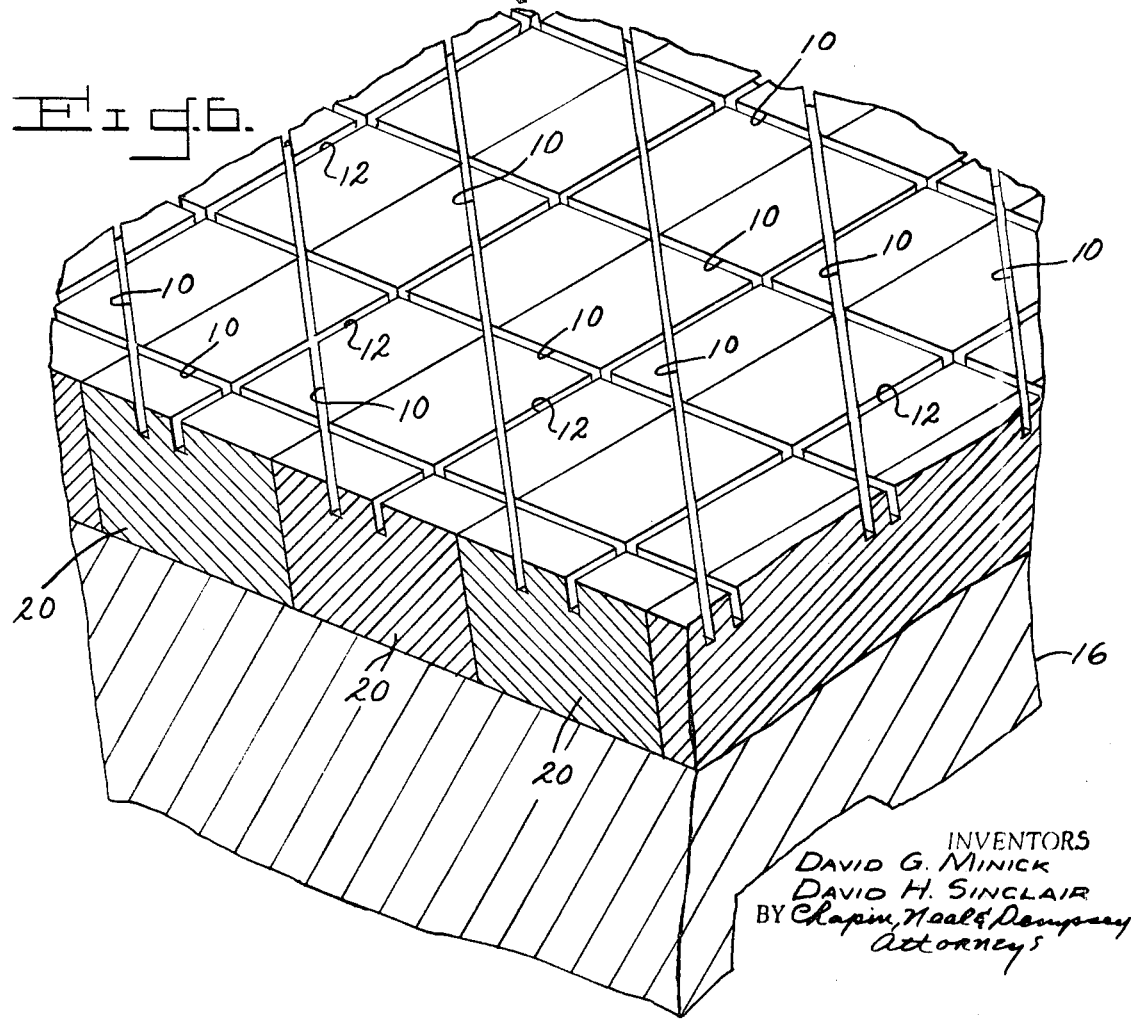

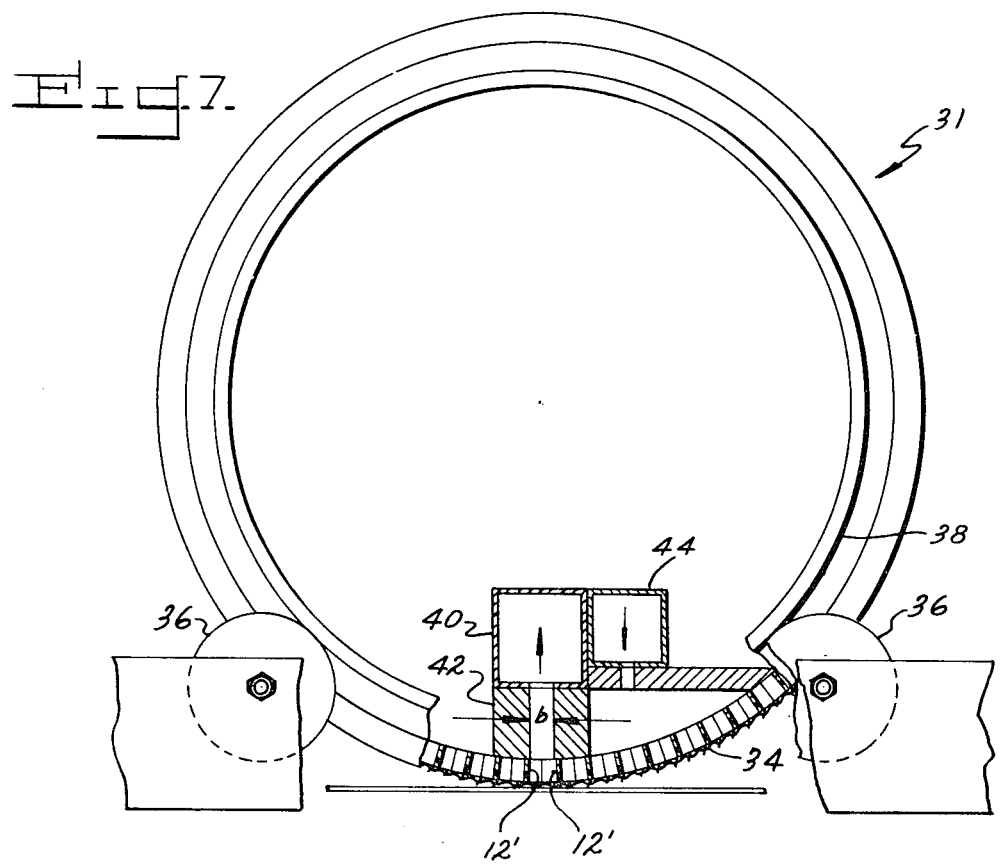
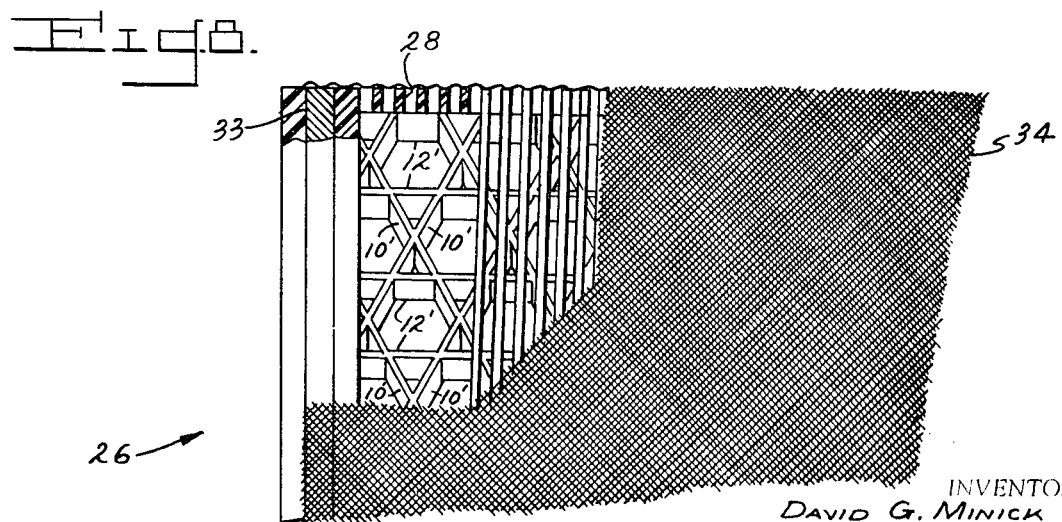

---

3,579,422
FILAMENT WOUND CYLINDRICAL STRUCTURES
FOR USE IN PAPER MAKING
David G. Minick, Westfield, and David H. Sinclair, South
Hadley, Mass., assignors to The Sinclair Company,
Holyoke, Mass.
Filed Oct. 7, 1968, Ser. No. 765,487
Int. Cl. D21f 1/46
U.S. Cl. 162—314                                    8 Claims

ABSTRACT OF THE DISCLOSURE

Cylindrical structure, such as a "dandy roll," constructed by the method of continuous filament winding in a honeycomb or open-work pattern formed on a collapsible mandrel. The filaments are impregnated with a thermosetting resin at the time of their application to the mandrel and the resin is cured and hardened to provide the open-work rib structure. In one embodiment the structure is composed of upstanding ribs formed on the dandy roll and bonded together in a hexagonal-triangular honeycomb pattern.

BACKGROUND

Dandy rolls and cylinder molds are conventionally made with a number of metal hoops or rings joined together by truss rods or ribs and a covering or wire mesh is wrapped around the support structure. In the manufacture of a conventional 48 inch diameter roll approximately 20,000 hand soldered joints are employed in fabricating the support structure requiring a construction time of approximately 300 to 400 man hours. If the rigid metal structure of the dandy roll becomes warped, damaged or dented in any way, it is necessary to re-true the cylindrical support surface in a time consuming operation.

The following is a description of the traditional method of manufacturing dandy rolls:

First a winding surface is prepared by mounting longitudinal strips of wood on a steel pipe. The strips of wood are machined to the desired diameter. A metal strip is then coiled under tension and locked to the wood strips forming base helical ribs.

A plurality of holes are next punched at circumferentially spaced locations in each loop of the helical ribs. Rods are inserted into these holes and each joint is soldered individually.

A series of slots are punched at the outermost extremity of the base ribs. Flexible rod stock is then laid into these slots in approximately a 45°–60° helix and soldered in place. This rod stock forms what is known as "truss rods." The outer extremities of the truss rods are located somewhat below the surface of the base ribs, perhaps 1/16″–1/8″ depending on the style of construction chosen.

The coiled ribs are then punched or milled again to provide 1/2 circle grooves for the top rods to be mounted. The top rods are positioned in these 1/2 circles and hand soldered into place.

The top rods are slotted by a milling operation which is essentially a continuous helix from one end of the shell to the other. Flat winding wire of perhaps .030″ x .125″ dimension is then fitted into these slots "on edge" so that the large dimension is radial to the roll center.

The end points of the flat winding wire are restrained and suitable ends are put on the roll shell for mounting and driving the roll.

As indicated such a construction sequence usually involves 300–400 man hours. This method is slow, costly and produces a structure inherently weak, subject to damage due to minor mishandling, and also subject to "creep" of the soldered points. "Creep" is the yielding of such joints at room temperature under a low load, while the dandy roll is in storage. The structure also is subject to corrosive attack of the liquids used in the formation of paper.

It is the principal object of this invention to provide integral filament wound resin structures for paper machinery which can be manufactured at drastically reduced cost and construction time as against comparable metal structures. For example, a dandy roll made in accordance with this invention requires only approximately 20-30 man hours which is a remarkable reduction from the usual 300–400 man hours required in the manufacture of a metal dandy roll.

It is another object of this invention to provide integral, fiber reinforced paper machinery which is strong but of such resilience as to resist dents and deformations to which the much heavier, rigid, multielement metal, structures are so subject.

A further object of this invention is to provide a method of manufacturing continuous wound fiber reinforced resin for paper machinery characterized by unlimited control of the geometry and strength of the structure.

Yet another object of this invention is to provide an integral, fiberglass-resin structure which is characterized by ease of repair and by minimal thermal expansion and contraction.

The above and other objects and advantages of this invention will be more readily apparent from the following description and with reference to the accompanying drawing, in which FIG. 1 is a perspective of a mandrel of the type which may be used in making a structure embodying this invention;

FIGS. 2 and 3 are end elevational views showing the mandrel of FIG. 1 in different operative conditions;

FIG. 4 is a section taken along line 4—4 of FIG. 2;

FIG. 5 is a partial perspective view of a dandy roll support structure of the type embodying this invention;

FIG. 6 is a partial perspective view showing the surface covering of a mandrel useful in carrying out this invention;

FIG. 7 is an end elevational view of a vacuum type dandy roll embodying the invention; and FIG. 8 is a partial side elevational view showing a dandy roll embodying this invention.

In the manufacture of paper making machinery, the following description of this invention will be with respect to a dandy roll, but it should be understood to be equally applicable to cylinder molds, vacuum rolls, washer rolls and thickening rolls. As described above, a dandy roll comprises a rigid metal support structure with a wire mesh cover disposed around the frame to provide a porous cylindrical surface which is used to apply a finish and watermark to high grade paper. This invention constitutes a radical departure from the multi-element metal, dandy roll structures presently available in the paper making industry.

In accordance with this invention an integral, fiber-reinforced, thermosetting resin structure is manufactured by a continuous winding process. The structure consists of a plurality of reinforcing layers, impregnated with a suitable thermosetting resin and laid up so as to provide upstanding ribs or beams arranged in an openwork honeycomb structure, one type of which is shown in FIG. 5. Of course, it will readily be appreciated that the structure of FIG. 5 is a very small portion of an entire cylinder, having overall the same geometrical rib pattern. The structure is formed by winding reinforcing strands 4, such as E-glass, treated with an organo silane coupling agent. It has been found that a bundle of 15 strands of glass may be applied as a single winding tape treated with an organo silane coupling agent. The winding tape of glass strands 4 is impregnated with suitable thermosetting resin, such as an epoxy, phenolic or polyester resin applied by some suitable applicator, such as shown at 6 in FIG. 1. The resin impregnated glass strands are then wound about a mandrel 8 rotated by some suitable means, such as a drive gear or chain connected to a sprocket 9.

A mold pattern is disposed on the outer surface of the mandrel and consists of a pattern of containments, such as projections or grooves by which the fiberglass strands are held in place in the desired geometrical pattern. In the embodiment shown, the surface of the mandrel includes a plurality of grooves 10 (FIGS. 1 and 6), which extend helically around the surface of the mandrel with the helix angle inclined first in one direction from end to end on the mandrel, and then in the opposite direction so as to form a diamond pattern defined by adjacent intersecting grooves. The diamond groove pattern, of course, produces the same beam or rib pattern in the dandy roll structure, as shown in FIG. 6, where ribs 10' are formed in the grooves 10 of the mandrel.

While in some cases a support structure may consist entirely of a diamond pattern of fiber-reinforced plastic ribs 10', in another embodiment it is preferable to include longitudinally extending beams or ribs 12' which give greater longitudinal stability to the dandy roll and, of course, greatly enhance its tensile and compressive strength. The ribs 12' may be formed in longitudinally extending grooves 12 formed at circumferentially spaced locations about the outer surface of the mandrel. As best shown in FIGS. 5 and 6, the longitudinal members are located so as to cross at approximately the midpoint of the sides of the parallelograms defining the diamond pattern so that equilateral triangles 13 and hexagons 15 are formed, the latter having 120° angles at each of its corners. This arrangement gives superior hoop strength and when combined with the structural stability attributable to the longitudinal ribs produces an outstanding dandy roll support structure.

In carrying out the method embodying this invention, the cured dandy roll so formed must be capable of being removed from the mandrel. After the thermoset resin has been cured, the fiberglass structure, although quite resilient, is nevertheless rigid to the extent that the mandrel must be collapsed for its removal from the dandy roll structure.

In the embodiment shown, the mandrel 8 comprises a number of segments 16 radially movable inward and outward through the movement of wedges 17 so that the diameter of its outer mold surface can be substantially reduced from that shown in FIG. 2 to their retracted position shown in FIG. 3. Six retractable segments are shown, each having a cylindrical outer surface portion, which in an extended condition provides a cylindrcal support surface for a mold cover 18 havng a suitable groove pattern to achieve the desired winding pattern of the fiberglass. As shown, a cover 18, with an appropriate groove pattern, is fitted about the outer surface of the mandrel segments. The cover 18 may be a flexible synthetic made of any suitable material, such as a unitary plastic sheet or strips of plastic, metal or wood, which either inherently or when treated with a release agent, possesses a low adhesive affinity for the resin-fiberglass structure. Where a unitary plastic sheet, such as polyethylene, is used, after the fiber-wound structure is cured and the mandrel segments retracted, as shown in FIG. 3, the flexible plastic covering 18 may be readily pressed inwardly and removed or stripped from the hardened dandy roll structure.

Alternatively, the mandrel cover may be composed of a pluraity of longitudinally extending strips 20 (FIG. 6), each shaped so that when fitted together in edge-to-edge relation they form the mandrel cover. Each strip includes a portion of the helical and longitudinal groove pattern so that when the mandrel segments are in their outermost positions a complete groove pattern is provided. When the mandrel segments are collapsed or retracted radially, as shown in FIG. 3, the individual strips may be pressed inwardly an dremoved from the fiberglass rib structure.

In the method of this invention the reinforcing strands 4, after being wetted or impregnated with a suitable thermosetting resin, are wound in the groove pattern of the mandrel. The lay-up of the impregnated glass fibers is accomplished in the grooves of both helical and longitudinal orientation. One layer is wound in all the grooves helically and longitudinally before the application of the second layer of the impregnated glass strands. When this lay-up method is carried out as a continuous process, the outer surface of the resulting rib structure conforms very closely to a perfect cylindrical surface of predetermined outer diameter. The continuity of the process and subsequent cure insures an entirely integral construction. After the lay-up is completed the mandrel may be placed in suitable heating chamber or oven to effect the final cure of the resin. Alternatively, a catalyzed resin system may be used whereby the cure may be completed at room temperature with the aid of suitable heating lamps to speed the curing process. After cure, the mandrel segments are retracted and the mold surface containing the groove pattern is removed by pressing it inwardly and freeing it from the hardened honeycomb structure. Thereafter, the outer surface of the structure is machined to provide a uniform cylindrical surface, and a screen cover 34 is applied as with the conventional dandy roll structure, as shown at 26 in FIG. 8.

After the honeycomb structure has been wound on the surface of the mandrel it may also be desirable to apply as a continuous fiber winding process an outer helical supporting structure 28 for the mesh screen 34. If this is desired, it is essential that it be accomplished substantially as a continuous process with the formation of the base structure. One suitable way of doing this is to apply helically around the mandrel 8, a radially extending flange 30 (FIG. 1). The flange may be formed by a continuous strip of plastic or suitable material having low adhesive characteristics. Of course, it will be understood that similar flanges would be applied over the entire length and about the circumference of the mandrel 8. These may be fitted in place on studs or pins 32 which extend either outward from the mandrel or from the undersurface of the flanges into mating sockets provided in the mandrel. Once the flange strip 30 is in place, the outer structure is formed by rotating the mandrel and winding the resin impregnated glass strands 4 between the helically disposed flanges. The lay-up is accomplished promptly after the lay-up of the honeycomb structure, and winding is continued until fiberglass ribs of suitable height are built up between the flange strip. The entire structure, both the honeycomb base and helical rib structure, is cured simultaneously in the manner previously described. After the flange strip 30 and mandrel are removed, the outer surface of the helical rib structure may be machined to provide the base support for the dandy roll screen. After the outer surface of the fiberglass structure has been machined or ground to a true cylinder, the machined surface is preferably coated with an epoxy or a urethane to seal the exposed glass ends against moisture intrusion. The metal screen 34 is then secured to the dandy roll surface using asuitable adhesive to effect a metal-resin bond. Another method of affixing the screen involves the use of a bronze or metal end ring 33 (FIG. 8) or attachment ring embedded in the head of the fiberglass dandy roll during the lay-up of the roll. The dandy roll over may then be soldered to the metal end ring.

In FIG. 7, a vacuum type dandy roll 31 is shown. The dandy roll is a fiberglass-resin composite constructed with longitudinal beam members such as shown at 12' in FIGS. 5 and 7, and includes a diamond pattern shown in FIG. 5.

A screen of suitable wire mesh 34 is fitted around the open-work structure. The dandy roll is supported by rolls 36 engaged with its trunnion ring portion 38 which extend outwardly of both ends of the cylindrical roll structure. Disposed within the roll is a vacuum conduit 40 communicating with a sealing box 42. The circumferential distance $a$ (FIG. 5) between the ribs or beams 12' is approximately the same as the width $b$ of the sealing box 42. With this arrangement vacuum drawn by the vacuum conduit 40 through the sealing box 42 is confined to a relatively narrow circumferential portion of the dandy roll and thus is not so spread as to be of reduced effectiveness. Without the longitudinal ribs 12', vacuum drawn through the same sealing box would extend over at least four times the circumferential distance as when confined between longitudinal beams 12'. A high pressure tube 44 is provided to blow air through the dandy roll structure and screen after the air passes over the vacuum section. This high pressure air acts to blow the sheet free of the surface of screen 34.

Using the above described methods, it will be realized that this invention provides an entirely integral, lightweight, corrosion-resistant structure which totally obviates the need of welded or soldered joints and thus drastically reduces the construction time compared with that required for conventional metallic dandy roll structures. Moreover, it will be realized that the manufacturer has unlimited control over the structure, geometry and strength. Thus, any desired rib pattern may be readily formed. For example, the diamond pattern may be made smaller or larger for any desired strength characteristics, and the cross sectional dimensions of the ribs may also be varied as desired. Thus the longitudinal ribs may be made of greater width or height to provide greater tensile or compressive strength for a dandy roll. This can be accomplished by simply adjusting the mandrel mold pattern and winding procedure and requires no special stock purchases or additional machining operations, such as would be necessary were a comparable change to be accomplished for metal dandy roll structures.

Additionally, where damage occurs to a wound fiber-reinforced structure, it has been found that the damage may be easily repaired by simply filling the defective section with resin impregnated fiberglass. Moreover, the adverse effects of temperature changes with respect to expansion and contraction of the structure are substantially eliminated. It has also been found that a lightweight mounting structure is adequate to supoprt the lightweight dandy roll structure. Indeed, polymeric roller bearings will properly support dandy roll structures fabricated in accordance with this invention. Suitable polymeric support structure is disclosed in copending application Ser. No. 720,437, filed Apr. 4, 1968, assigned to the same assignee as this application. Since the fiberglass dandy roll is only about ⅓ to ¼ the weight of steel dandy rolls, the operating power requirements are markedly lower.

Having thus described this invention, what is claimed is:

1. Paper machine element in the form of an integral, open-work cylinder comprising continuous upstanding ribs each having a height not less than its width and extending helically about the cylinder in opposite directions forming a diamond pattern defined by the intersecting of said upstanding ribs, said ribs being composed of cured thermosetting resin reinforced throughout by multiple layers of filaments continuous throughout said oppositely extending ribs including the intersections thereof and a mesh cover disposed around said cylinder.

2. Paper machine element as set forth in claim 1 in which said cylinder is supported by polymeric roller bearings.

3. Paper machine element as set forth in claim 1 further including a plurality of circumferentially-spaced, longitudianally-extending beams intersecting the rectangles forming said diamond pattern at the side thereof so that each rectangle is divided into a triangular-hexagonal pattern, said beams being composed of cured thermosetting resin reinforced throughout their length by multiple layers of continuous filaments, the layers of filaments in the longitudinal beams being intermeshed with said layers of filaments in the ribs, the outer surface of both said beams and ribs lying in a common cylindrical surface.

4. Paper machine element as set forth in claim 3 in which a vacuum box is disposed within said cylindrical structure and has a longitudinally extending opening of circumferential width not greater than the circumferential spacing between adjacent beams of said structure.

5. Paper machine element in the form of an open-work cylindrical structure, said structure being entirely integral and formed by continuous fiberglass strands embedded in a thermosetting resin, said structure comprising radially upstanding ribs each having a height not less than its width and arranged as cross-wound helices intersecting in a rectangular pattern, said fiberglass strands being continuous throughout said cross-wound helics including the intersections thereof, an outer rib structure formed on said rectangular pattern and integral therewith comprising a flange extending helically from end to end of said structure with the outer edge defining a cylindrical surface, and a porous cover fitted about said surface over the length of said structure.

6. Method of making dandy rolls and the like comprising steps of winding on a collapsible mandrel fiberglass strands in continuous lengths impregnated with a thermosetting resin, said mandrel having an outer surface with containment means of a radial depth sufficient to retain multiple layers of continuous fiberglass strands to receive and retain said strands in the form of an upstanding rib pattern, continuously winding said fiberglass strands about said mandrel in a cross-helical pattern to form an open-work diamond-shaped rib pattern, curing the resin while the windings are on said mandrel and thereafter collapsing and removing the cured open-work structure from the mandrel.

7. Method as set forth in claim 6 in which as a continuous process, circumferentially spaced, longitudinally extending ribs are wound about said mandrel with each winding thereof intermeshed with the helically extending ribs, after cure of said resin machining the outer surface of said ribs to a uniform cylindrical surface.

8. Method as set forth in claim 7 in which said cylinder is provided with fiberglass-resin composite end rings and in which metallic bands are embedded in said rings during the lay-up thereof, applying a metallic mesh cover around said cylindrical surfaces and affixing the ends thereof to the embedded metal bands.

References Cited

UNITED STATES PATENTS

| 2,803,172 | 8/1957 | Trotman | 29—121 A |
| 3,016,315 | 1/1962 | Robinson | 162—372 |
| 3,095,634 | 7/1963 | Williams et al. | 29—121.8 |
| 3,105,043 | 9/1963 | Rich et al. | 162—357 |
| 3,139,375 | 6/1964 | Bryand | 29—121 |

FOREIGN PATENTS

| 532,289 | 10/1958 | Canada | 308—Digest N |

OTHER REFERENCES

Encyclopedia of Polymer Science and Technology, vol. 6, pp. 713, 716–723; 727, 735, 737, 739, 740, John Wiley and Sons, Inc., N.Y. 1967.

REUBEN FRIEDMAN, Primary Examiner

T. A. GRANGER, Assistant Examiner

U.S. Cl. X.R.

29—127; 156—169; 162—357; 210—402